US012546163B2

(12) United States Patent
Olorundimu

(10) Patent No.: US 12,546,163 B2
(45) Date of Patent: Feb. 10, 2026

(54) BLIND REPAIR APPARATUS AND METHOD

(71) Applicant: Shadene Tomica C. Olorundimu, Airdrie (CA)

(72) Inventor: Shadene Tomica C. Olorundimu, Airdrie (CA)

( * ) Notice: Subject to any disclaimer, the term of this patent is extended or adjusted under 35 U.S.C. 154(b) by 429 days.

(21) Appl. No.: 17/695,772

(22) Filed: Mar. 15, 2022

(65) Prior Publication Data

US 2022/0298852 A1 Sep. 22, 2022

Related U.S. Application Data

(60) Provisional application No. 63/164,375, filed on Mar. 22, 2021.

(51) Int. Cl.
*E06B 9/386* (2006.01)
*E06B 9/266* (2006.01)

(52) U.S. Cl.
CPC .............. *E06B 9/266* (2013.01); *E06B 9/386* (2013.01)

(58) Field of Classification Search
CPC .......... E06B 9/266; E06B 9/386; E06B 9/367; E06B 9/36; E06B 9/362; E06B 9/38; A47H 13/00; A47H 13/01; A47H 13/06; A47H 13/14
See application file for complete search history.

(56) References Cited

U.S. PATENT DOCUMENTS 3,277,952 A * 10/1966 Tsuhako .................. E06B 3/481 160/183
4,356,855 A * 11/1982 Holzer .................... E06B 9/367 160/178.1 R
4,718,962 A * 1/1988 Goodwin ................. A47K 3/38 156/247
5,271,447 A * 12/1993 Aronovich .............. E06B 9/386 160/236
5,458,939 A * 10/1995 Kitchen .................. B29C 73/04 428/317.1
6,289,563 B1 * 9/2001 Watkins .................. E06B 9/367 428/40.1

(Continued)

FOREIGN PATENT DOCUMENTS

WO WO-2016114516 A1 * 7/2016 ............ A47H 13/00

OTHER PUBLICATIONS

Machine translation WO2016114516 (Year: 2016).*

*Primary Examiner* — Johnnie A. Shablack
*Assistant Examiner* — Jeremy C Ramsey
(74) *Attorney, Agent, or Firm* — Angela M. Keuling; Parlee McLaws LLP

(57) ABSTRACT

A blind repair device for repairing a vane of a blind system has a generally oblong body having a central opening, and a repair structure that can be aligned with a connection aperture of the vane. The repair device can be fit over and secured to the vane to align the repair structure with the connection aperture such that the ability of the vane to couple to a runner/hanger of the blind system is restored. The repair device can be expanded to more easily fit the vane through the central opening. The body of the device can be made of a resilient material, a rigid material, or a combination of resilient and rigid materials. The body can have gripping elements such as nodes, teeth, or a rough surface to secure the repair device to the vane.

20 Claims, 9 Drawing Sheets

(56) References Cited

U.S. PATENT DOCUMENTS

| | | | | |
|---|---|---|---|---|
| 2006/0278350 | A1* | 12/2006 | Zamarripa | E06B 9/367 160/178.1 V |
| 2008/0173410 | A1* | 7/2008 | Chen | E06B 9/36 160/236 |
| 2008/0236766 | A1* | 10/2008 | Vandervoort | B29C 66/73116 160/172 V |
| 2008/0295978 | A1* | 12/2008 | Keasberry | E06B 9/367 160/178.3 |
| 2014/0193600 | A1* | 7/2014 | Barudin | E06B 9/386 428/41.7 |

* cited by examiner 24a
32
B
B
B
A
A
26
34
38/24b
14
15
36
20
18
32
B-B
A-A

BLIND REPAIR APPARATUS AND METHOD

CROSS-REFERENCE TO RELATED APPLICATIONS

This application claims the benefit of U.S. Provisional Application 63/164,375 filed Mar. 22, 2021 the entirety of which is incorporated fully herein by reference.

FIELD

Embodiments herein relate to window coverings and blind systems and, more particularly, to apparatus and methods for repairing or reinforcing vanes or louvers of blinds.

BACKGROUND

Blind systems comprise a plurality of vanes or louvers hanging vertically and arranged generally linearly on a track. Each individual vane has a connection portion comprising a connection aperture that permits attachment of the vane to a runner or hanger configured to traverse the track when the blinds are actuated by a user, for example to open or close the blinds. The vanes hang from the runners and travel therewith along the track upon actuation by the user.

It is common for vanes to become damaged due to pulling thereon, for example by children or pets, or due to the vanes catching on an obstacle while the blinds are being actuated. Such damage can manifest as a break or tear in the vane near the connection aperture, the aperture being a point of structural weakness. At times, the break or tear can extend from the connection aperture to an edge of the vane, rendering reattachment of the vane to the runner difficult or impossible. In the event of a damaged vane, one solution is to simply replace the vane. However, it can be difficult to find matching replacement vanes. Another solution is to replace the blind system entirely if repairs are unsuccessful. However, such a solution is costly and generates unnecessary waste.

It is also known to repair damaged vanes. For example, a repair patch having a replacement connection aperture can be fixed to the damaged vane, such that the replacement connection aperture is aligned with the damaged connection aperture of the vane. The repair patch can be fixed to the vane via an adhesive, fasteners, or a combination thereof. While repair patches are effective at temporarily repairing damaged vanes, adhesives can degrade and wear off over time, particularly if exposed to sunlight. As such, repair patches tend to peel off over time and must be replaced. Repair patches can also leave an adhesive residue when removed or after peeling off due to wear, which can attract dust and other debris. Further, the use of repair patches may result in the blinds taking on an aesthetically displeasing appearance due to a conspicuous repair patch being fixed to the vanes.

Vane repair clips and other attachments may also be used in place of patches. Said clips are typically removably or permanently attached to the damaged vanes, for example via fasteners or friction fit, and have a replacement connection aperture to align with and restore/replace the functionality of the damaged connection aperture. However, vane repair clips are often rigid, for example made of a rigid plastic or a metal, and therefore must be sized and shaped to accommodate the specific vane to be repaired such that a secure fit is achieved and the clip can fit over, and align with, the vane.

The rigid material of the repair clips also makes securement of the clip over the vane difficult, and can result in damage to the vane or clip.

Moreover, vanes having repair clips secured thereto have a tendency to become caught or stuck together due to the bulk of the repair clips, making the opening or closing of the blind problematic.

In cases wherein fasteners are used to secure the repair patch or clip to the vane, installation may require special tools, such as pliers, and relatively complex installation steps, which can discourage users from performing repairs altogether. Use of fasteners and tools can also result in the vanes being scratched or damaged during installation.

Thus, there is interest in the industry for an improved vane repair device capable of accommodating vanes of various shapes and sizes.

SUMMARY

Embodiments of a blind repair device for repairing a vane of a blind system are provided. The repair device has a generally oblong body having a central opening, and a repair structure that can be aligned with a connection aperture of the vane. The repair device can be fit over and secured to the vane to align the repair structure with the connection aperture such that the ability of the vane to couple to a runner/hanger of the blind system is restored. The repair device can be expanded to more easily fit the vane through the central opening. In embodiments, the body of the device can be made of a resilient material, a rigid material, or a combination of resilient and rigid materials. The body can have gripping elements such as nodes, teeth, or a rough surface to secure the repair device to the vane.

In a broad aspect, a repair device is provided for repairing a vane of a blind system, the vane having a connection aperture, comprising: a body having first and second edge portions and first and second elongate portions spanning therebetween defining a central opening configured to receive the vane therethrough; and at least one reinforcement structure configured to be aligned with the connection aperture of the vane.

In an embodiment, the reinforcement structure comprises a first notch formed in the first elongated portion, and a second notch formed in the second elongated portion.

In an embodiment, the reinforcement structure comprises a first repair aperture formed in the first elongate portion and a second repair aperture formed in the second elongate portion.

In an embodiment, the body comprises one or more cutouts for facilitating opening or expansion of the repair device for receiving the vane.

In an embodiment, the body comprises one or more gripping elements located on an inner surface of the body for gripping the vane.

In an embodiment, the one or more gripping elements comprise one or more teeth extending radially inwardly from the inner surface of the body.

In an embodiment, the one or more teeth comprise one or more arrays of teeth arranged in an opposing and alternating manner.

In an embodiment, the one or more gripping elements comprise a plurality of nodes arranged along the inner surface of the body.

In an embodiment, the repair device is made of at least a resilient material.

In an embodiment, the body comprises flexible portions comprising the resilient material, and rigid portions comprising a rigid material.

In an embodiment, the rigid portions comprise the resilient material reinforced with the rigid material.

In an embodiment, the rigid portions comprise rigid material fixed to the resilient material.

In an embodiment, the rigid portions comprise rigid material sandwiching the resilient material.

In an embodiment, the repair device if made of at least a rigid material.

In an embodiment, the body comprises at least one chamfered portion adjacent an inner surface of the body for facilitating the insertion of the vane into the central opening.

In an embodiment, the body is curved.

In another broad aspect, a repair device is provided for repairing a vane of a blind system, the vane having a connection aperture, comprising: a body having a generally oblong shape and defining a central opening, the body actuable between an expanded position for receiving the vane therethrough, and a closed position for securing the repair device to the vane; and at least one reinforcement structure configured to be aligned with the connection aperture of the vane.

In an embodiment, the body is curved, and in the expanded position a first elongate portion of the body is deflected away from a second elongate portion of the body to expand the central opening.

In an embodiment, the body comprises one of more cutouts for facilitating actuation of the repair device between the expanded and closed positions.

In an embodiment, the repair device is made of at least a resilient material.

DETAILED DESCRIPTION

Figure 1A:
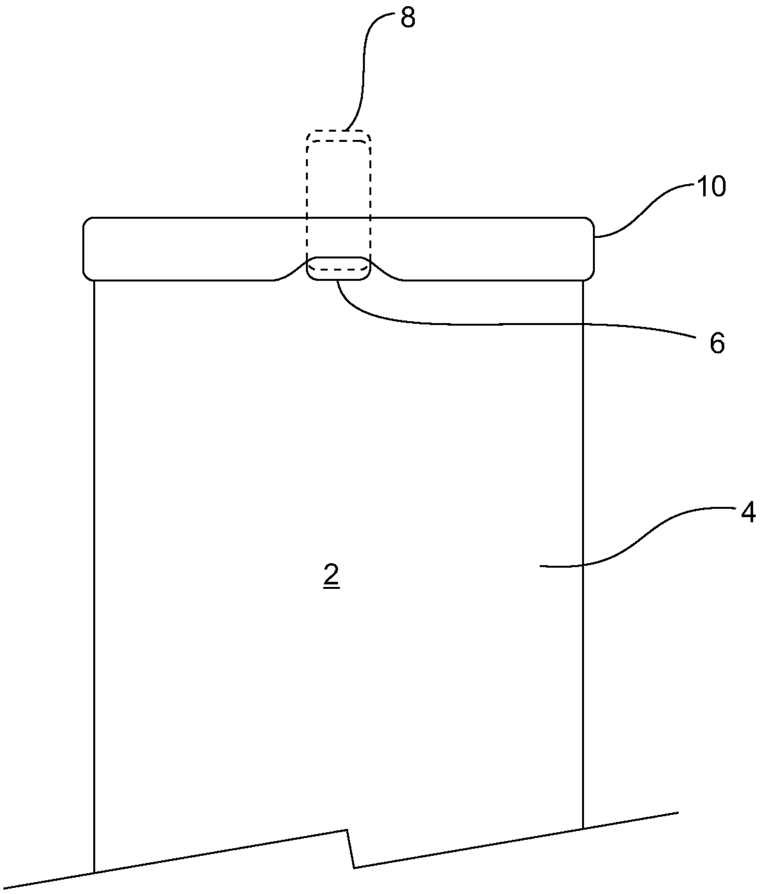
FIG. 1A depicts an embodiment of a blind repair device having a notch installed on a vane of a blind system and acting to couple the vane with a blind runner.

With reference to FIGS. 1-5G, in an embodiment, an improved blind repair device 10 is provided, comprising a generally oval or oblong body 12 defining a central, vane-receiving opening or slot 14 through which a vane 2, such as a vane of a blind system, may be inserted. The body 12 comprises opposing edge portions 16, and elongated intermediate portions 18 extending therebetween, for engaging the vane 2. In the depicted embodiments, the intermediate portions 18 of the body comprise a reinforcement structure such as notches 20 for aligning with the connection aperture 6 of the vane 2 to be repaired and providing a new connection means by which to connect the vane 2 to a respective blind hanger 8. In other embodiments, instead of notches 20, the body can comprise repair apertures 22 that may be aligned with the damaged connection aperture 6 and again provide a new connection means for coupling the vane 2 to the blind hanger.

Figure 1B:
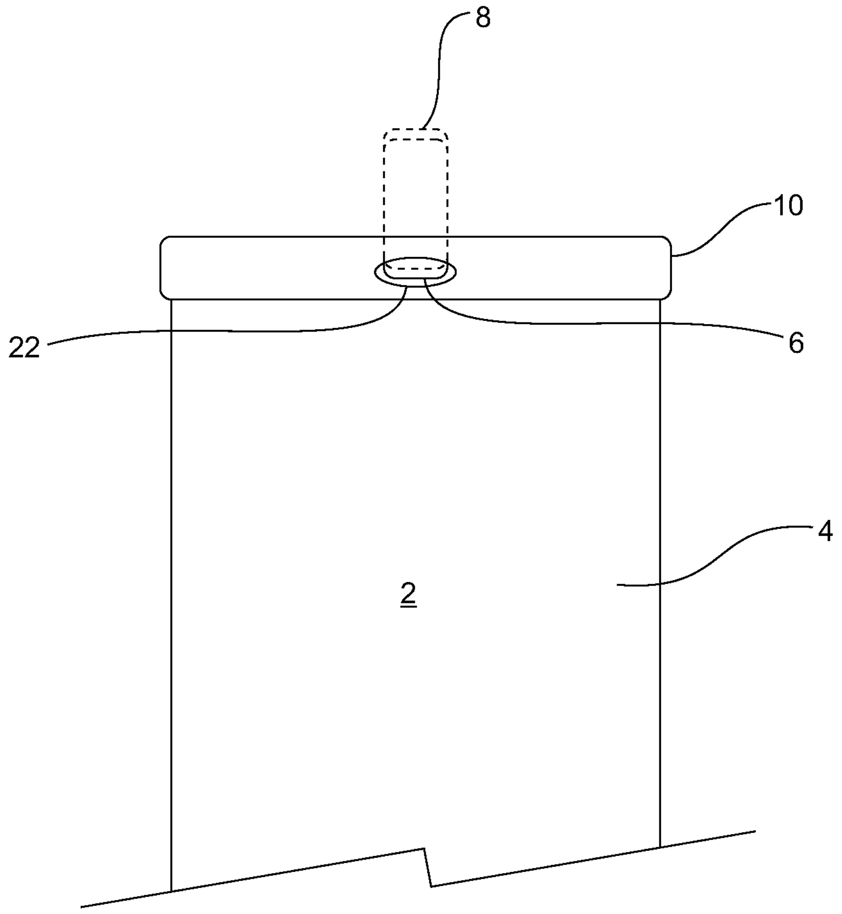
FIG. 1B depicts another embodiment of a blind repair device having a repair aperture installed on a vane of a blind system and acting to couple the vane with a blind runner.

In embodiments, the body 12 is composed at least partially of a first resilient material 24 to permit the repair device 10 to be temporarily expanded to more easily insert the vane 2 through the central opening 14. For example, the elongate portions 18,18 of the repair device 10 can be separated to expand the central opening 14, and/or the edge portions 16,16 can be separated to expand the repair device 10 lengthwise. Once the body 12 has been positioned at the desired location on the vane 2, for example such that the notch 20/replacement connection aperture 22 of the body 12 is aligned with the connection aperture 6 of the vane 2, it can be permitted to contract around the vane 2 to secure the repair device 10 thereto. Once secured to the vane 2, the repair device 10 is capable of coupling the vane 2 to the blind hanger, for example as shown in FIG. 1. At least partially forming the body 12 with a resilient material 24 enables the repair device 10 to fit over vanes 2 of various sizes.

In other embodiments, the repair device 10 can be formed of a substantially rigid material 26 with limited elastic deformation properties. Such embodiments can comprise a body 12 configured to closely fit the dimensions of the vane 2 to be repaired, such that only limited, if any, deformation of the repair device 10 is required to fit the vane 2 through the central opening 14 and secure the repair device 10 to the vane 2.

Figure 2A:
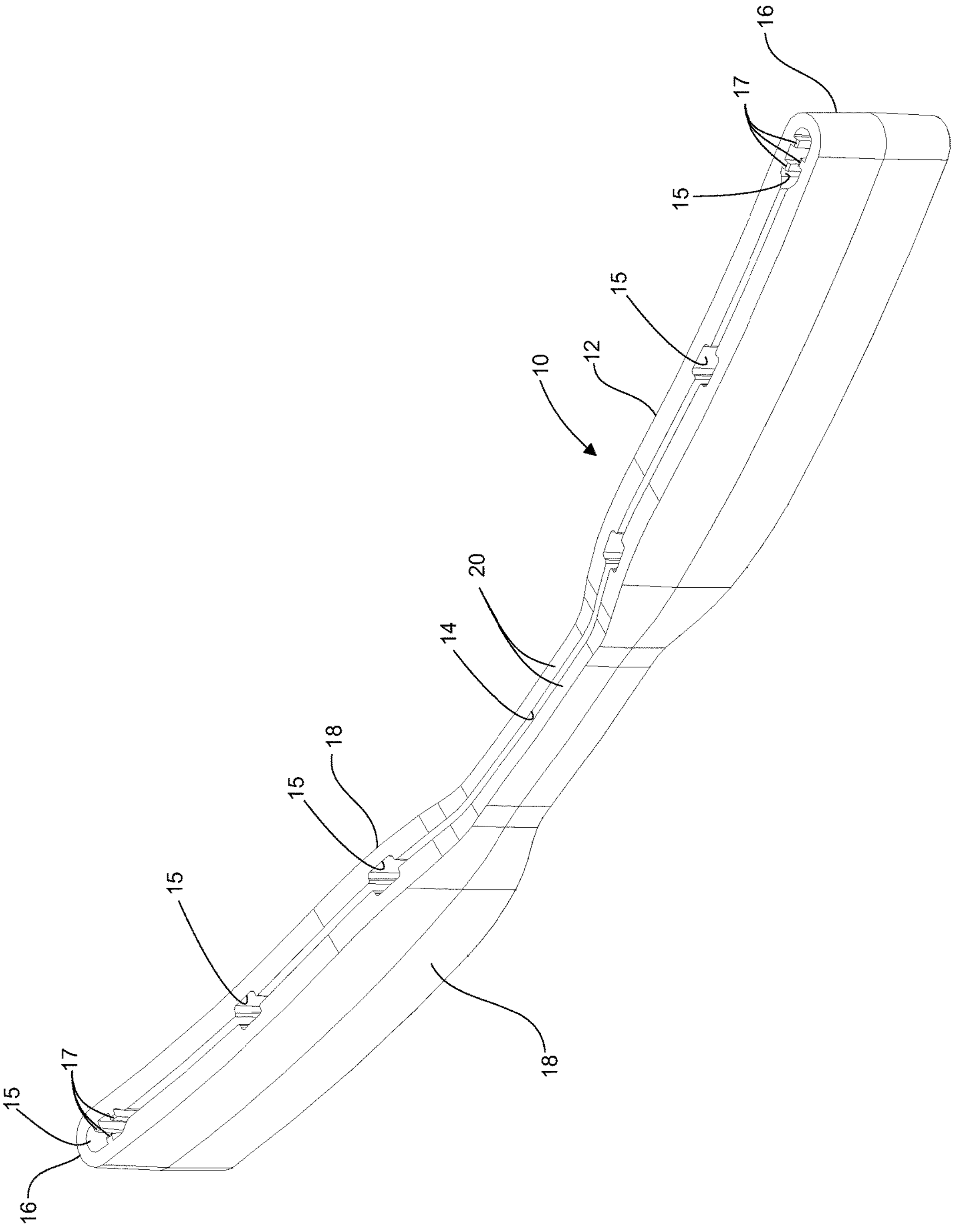
FIG. 2A is a perspective view of an embodiment of a blind repair device.
Figure 2B:
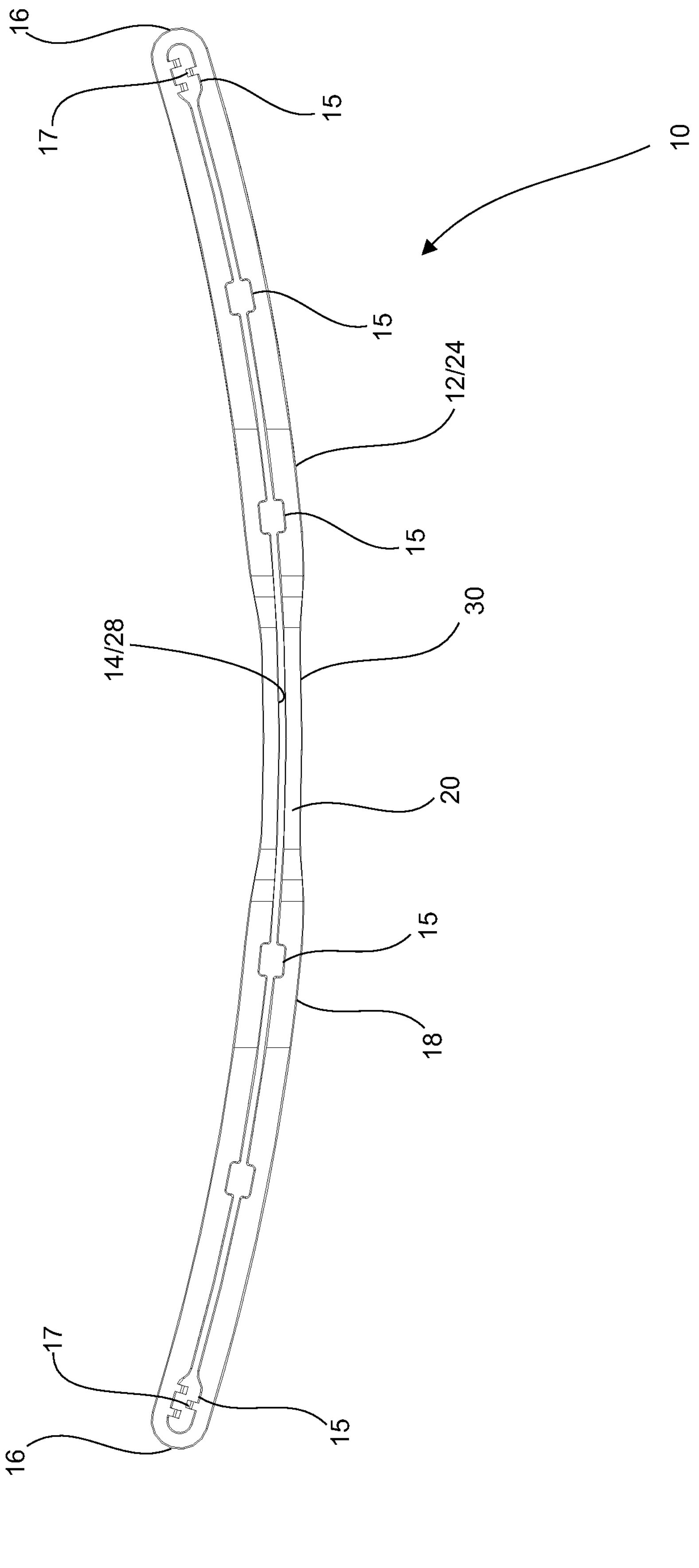
FIG. 2B is a top plan view of the blind repair device of FIG. 2A.
Figure 2C:
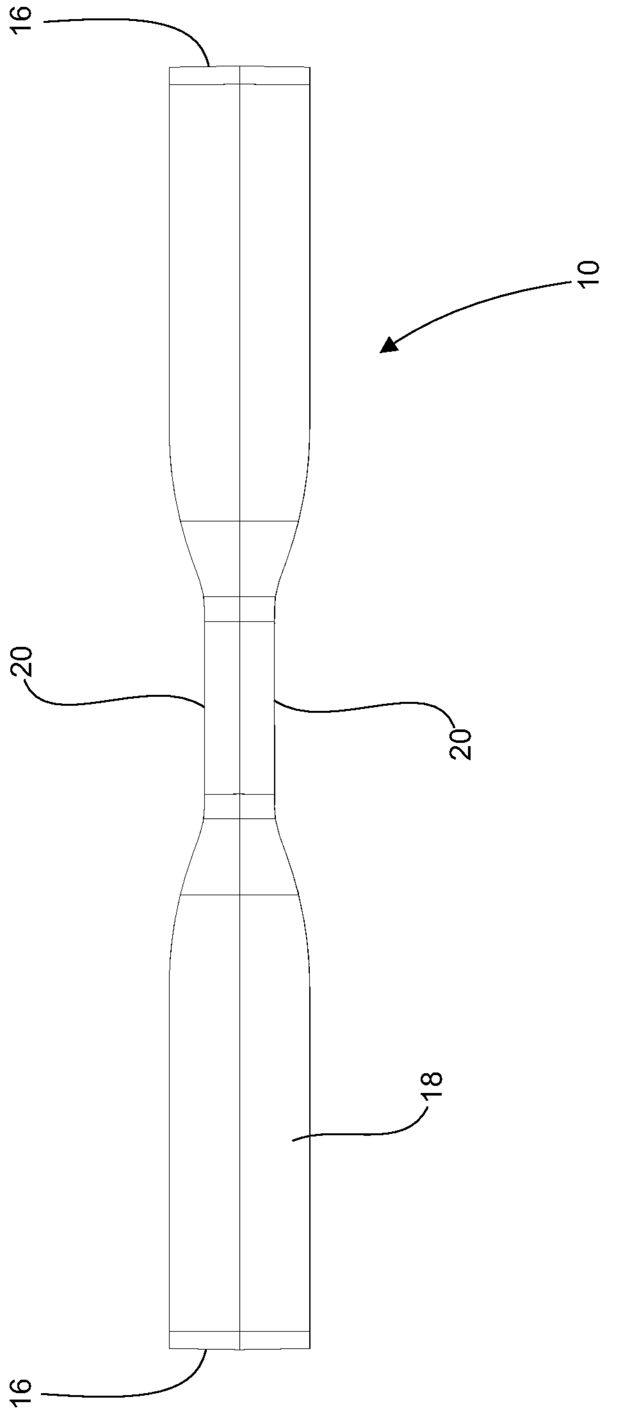
FIG. 2C is a front elevation view of the blind repair device of FIG. 2A.
Figure 3A:
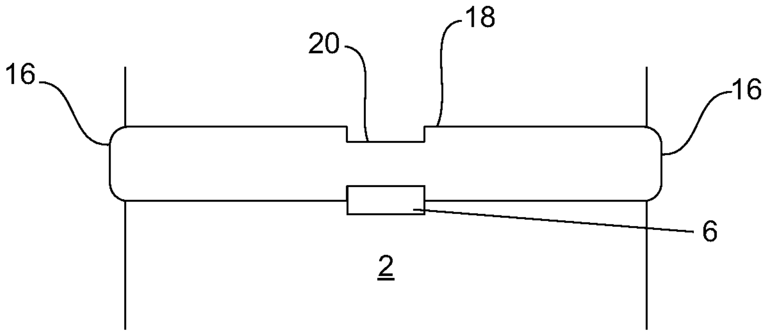
FIG. 3A is an elevation view of an embodiment of a blind repair device.
Figure 3B:
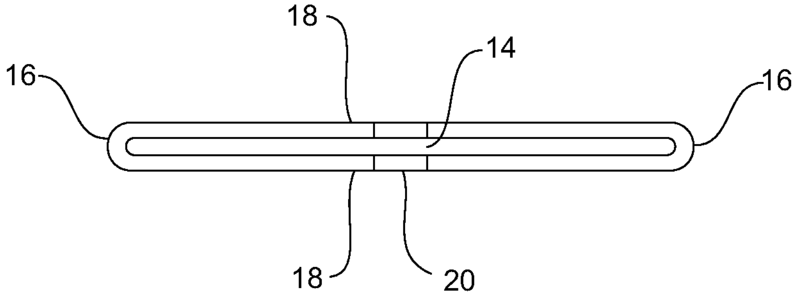
FIG. 3B is a top plan view of the repair device of FIG. 3A.

FIGS. 2A-2C depict one exemplary embodiment of the repair device 10. In an embodiment, the repair device 10 is made of an at least partially resilient material 24. The radially inner surface 28 of the body 12 comprises cutouts 15 spaced along the length of the body 12 for facilitating the opening or expansion of the repair device 10 for receiving the vane 2 to be repaired therethrough. The cutouts 15 can also serve to guide the vane 2 into the central opening 14. In the depicted embodiment, cutouts 15 are located at the edge portions 16 of the repair device 10 and have one or more teeth 17 configured to extend radially inward and grip the vane 2 when the repair device 10 is in the closed/non-expanded position. In the depicted embodiment, the teeth 17 are grouped in arrays at the edge portions 16 and arranged in an opposing and alternating manner. The teeth 17 permit the repair device 10 to be more securely fixed to the vane 2 to be repaired. In other embodiments, teeth 17 can be present along other portions of the repair device 10, for example along the elongated portions 18 or within other cutouts 15 besides those located at the edge portions 16.

Figure 4A:
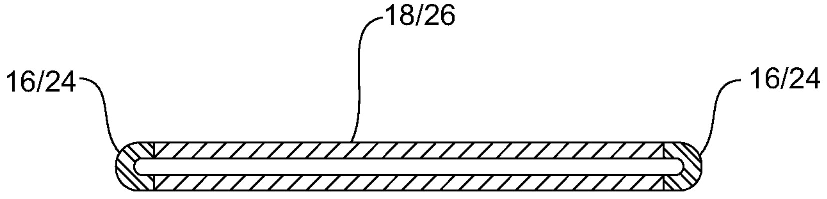
FIG. 4A is a top plan cross-sectional view of a repair device having elongated portions comprised of a rigid material and end portions comprised of a resilient material.
Figure 4B:
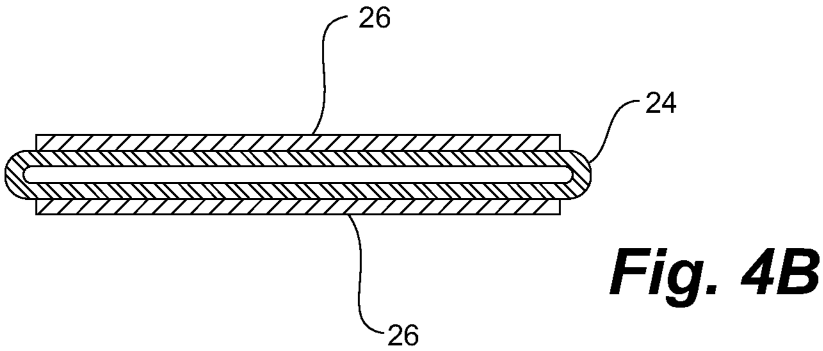
FIG. 4B is a top plan cross-sectional view of a repair device having a body comprised of a resilient material and reinforced with a rigid material along its elongated portions.
Figure 4C:
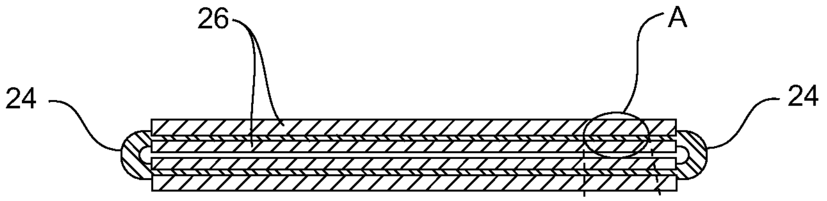
FIG. 4C is a top plan cross-sectional view of a repair device having a body comprised of a resilient material and reinforced with a rigid material sandwiching the resilient material along its elongated portions.
Figure 4D:
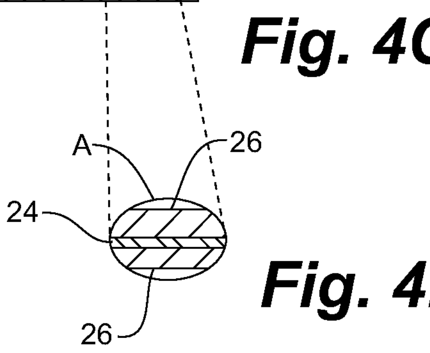
FIG. 4D is a detail cross-sectional view of an elongated portion of the repair device showing the resilient material sandwiched between layers of rigid material.
Figure 4E:
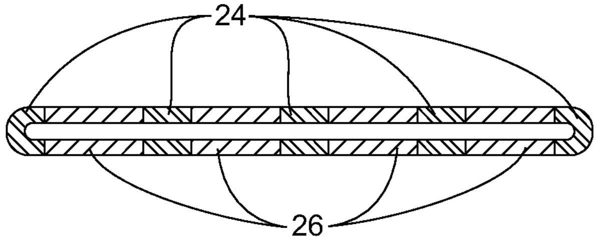
FIG. 4E is a top plan cross-sectional view of a repair device having a body comprised of a resilient material and a rigid material, the body having sections of rigid material interspersed at intervals therein.

In embodiments, the body 12 is composed of two or more materials. For example, with reference to FIGS. 4A to 4E, the body can partially comprise a rigid material 26 so as to provide strength to the structure thereof and protect the vane 2 from further damage, and further partially comprise a resilient material 24 to permit the body 12 to temporarily be expanded to allow the vane 5 to fit through the central opening 14. In embodiments, referring to FIG. 4A, the intermediate portions 18 can be made of the rigid material 26 while the edge portions 16 are made of the resilient material 26. In other embodiments, with reference to FIGS. 4B to 4D, the entire body 12 is made of the resilient material 24 and portions of the body are reinforced with the rigid material 26, such as by bonding the rigid material 26 thereto. For example, the rigid material 26 can be bonded to the elongated or intermediate portions of the body 12. As shown in FIG. 4B, the rigid material 26 can be formed into elongated members to be fixed to the elongated portions 18 of the body, or into multiple smaller members to be fixed onto the body 12. In some embodiments, with reference to FIGS. 4C and 4D, the rigid material 26 is fixed to both the radially inner surface 28 and radially outer surface 30 of the body 12, so as to sandwich the resilient material 24 between the rigid material 26. In other embodiments, with reference to FIG. 4E, the resilient and rigid portions can be formed integrally with the body 12, for example during the molding process. In this manner, the repair device 10 possess the advantage of a flexible material 24, such as the ability to temporarily expand to accommodate various sizes and shapes of vanes, while retaining the structural strength to support the vanes 2 when hung on the blind hangers.

In one embodiment, the rigid material 26 is a thermoplastic polymer such as Acrylonitrile Butadiene Styrene (ABS) and the resilient material 24 is thermoplastic polyurethane (TPU).

In embodiments, other means may be used to secure the repair device 10 to the vane 2, including extending fasteners through apertures formed in the body 12 and the vane 2. Such securing means may be used in place of, or in addition to, fitting the repair device 10 over the vane 2 and securing thereto via friction.

FIGS. 5A-5G depict another embodiment of the repair device 10. In the depicted embodiment, the edge portions are made of a resilient material **24*a* while the intermediate portions 18 of the body 12 are made of a rigid material 26. The repair device 10 further comprises an overmold layer 38 covering some or all of the radially inner and/or outer surfaces 28,30 of the body 12. The overmold layer 38 can comprise a second resilient material 24*b*, which can be the same or a different material than the resilient material 24*a* of the edge portions 16. Further, in embodiments, one or more gripping elements 32 can be formed on the overmold layer 38 to better secure the repair device 10 to the vane 2. For example, the gripping elements 32 can comprise a plurality of nodes, such as hemispherical or spike-shaped nodes, extending from the surface of the overmold layer 38. In other embodiments, the gripping elements 32 can be teeth 17, ridges, and other suitable structures for gripping the vane 2. In still other embodiments, the gripping elements 32 can be a rough textured surface. Gripping elements 32 can also be provided on the radially outer surface of the overmold layer 38 to provide a better handling interface for the user. In embodiments, the repair device 10 can also have outer gripping elements 36 located on the radially outer surface, such as on the overmold layer 38, to make manipulation of the device 10** easier for a user.

Figures 5A, 5B, 5C, 5D, 5E, 5F, 5G:
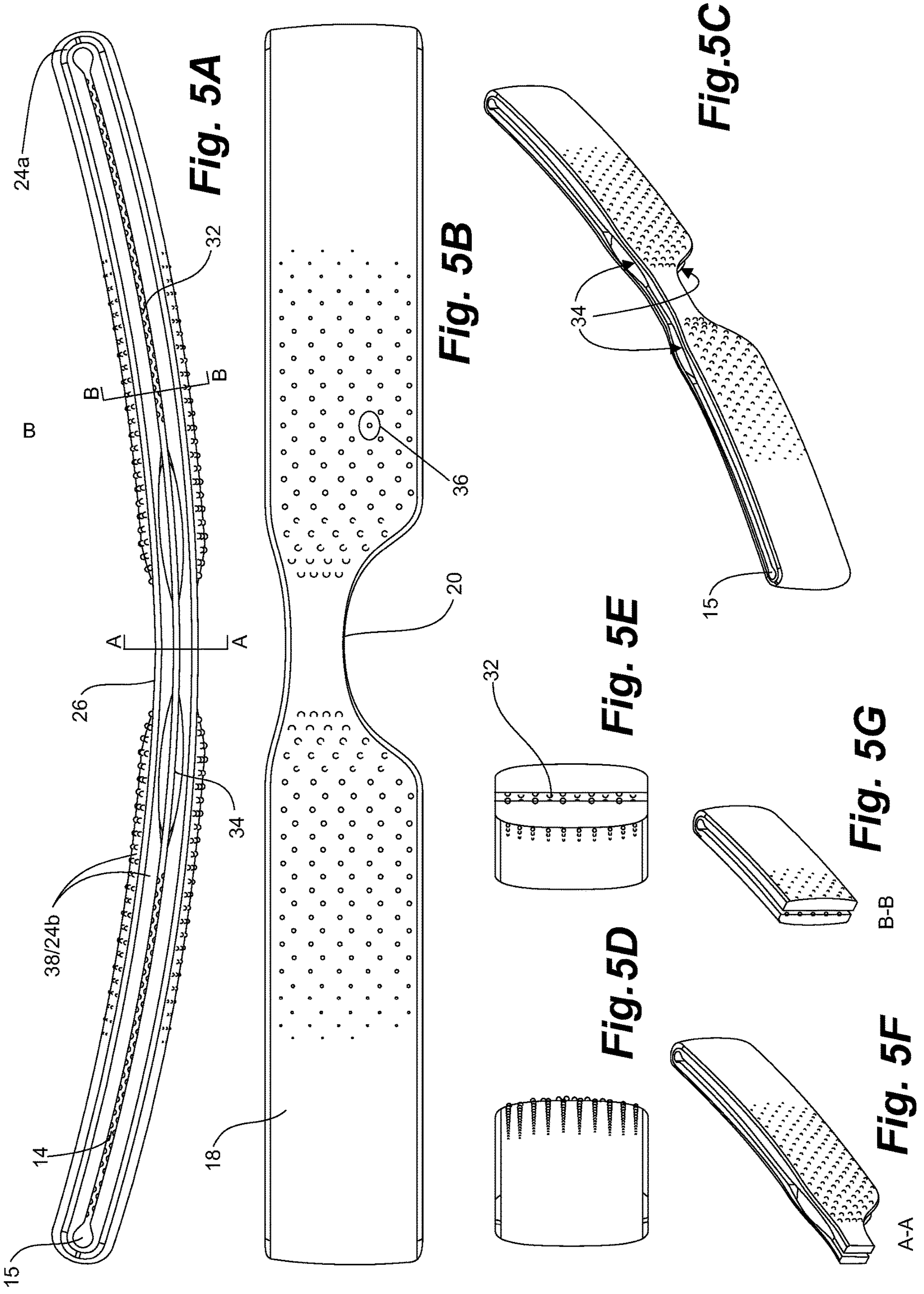
FIG. 5A is a top plan view of an embodiment of a repair device having a concave profile and gripping elements.
FIG. 5B is a front elevation view of the repair device of FIG. 5A.
FIG. 5C is a perspective view of the repair device of FIG. 5A.
FIG. 5D is a side elevation view of the repair device of FIG. 5A.
FIG. 5E is cross-sectional side elevation view of the repair device of FIG. 5A.
FIG. 5F is a perspective cross-sectional view of the repair device of FIG. 5A along section line A-A.
FIG. 5G is a perspective cross-sectional view of the repair device of FIG. 5A along section line B-B.

In other embodiments, as shown in FIGS. 5A, 5C, and 5F, the repair device 10 can comprise a chamfered portion 34 on a top and/or bottom edge thereof adjacent the radially inner surface 28. Such a chamfered portion 34 increases the ease with which a vane 2 may be inserted into the central opening 14 of the repair device 10. Similarly, the inside of the edge portions 16 can comprise a rounded section or cutout 15 to more easily receive a vane 2, permit the repair device 10 to expand to receive the vane 2, and better secure the repair device 10 to the vane 2.

In use, the repair device 10 of FIGS. 5A-5G can be expanded to enlarge the central opening 14 thereof, due to the flex provided by the resilient material 24 of the edge portions 24. The vane 2 to be repaired can then be inserted through the central opening 14 until the notch 20 or replacement connection aperture 22 of the repair device 10 is aligned with the damaged connection aperture 6 of the vane 2. Once aligned, the repair device 10 can be permitted to close such that the central opening 14 returns to its original size and shape. The radially inner surface 28 of the repair device 10 then grips the vane 2, thereby securing the device 10 to the vane 2. The vane 2 can then be re-attached to a corresponding blind runner or hanger. The repair device of FIGS. 1-4E can be used in a similar manner to repair or reinforce a vane 2.

Figure 6B:
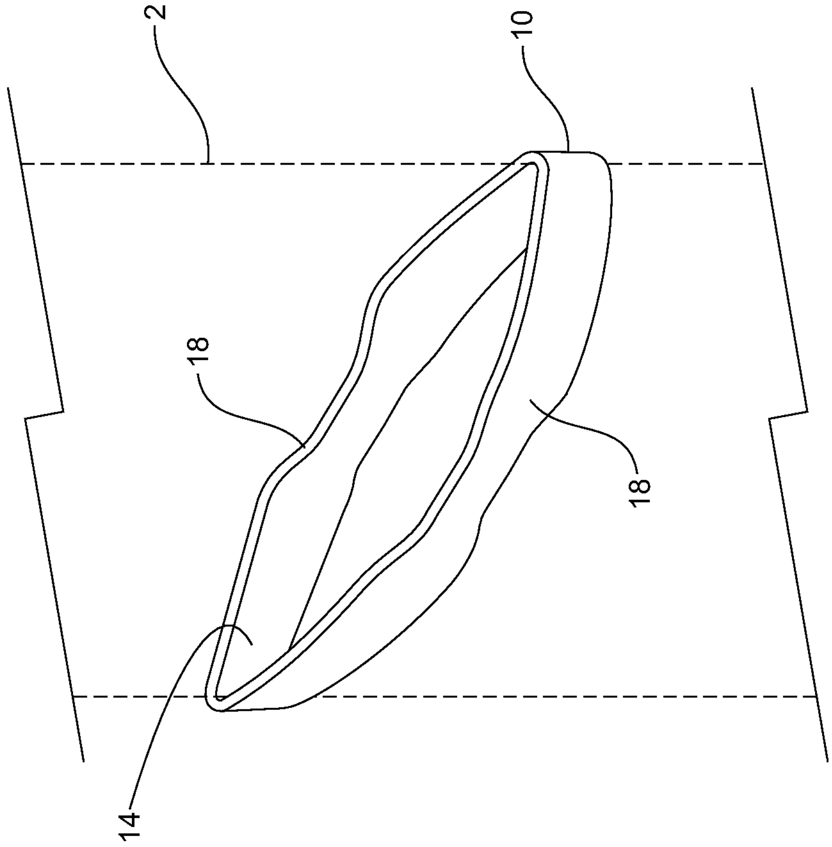
FIG. 6B is a perspective view of an embodiment of the repair device of FIG. 6A in an open/expanded position having a vane inserted therethrough.
Figure 6A:
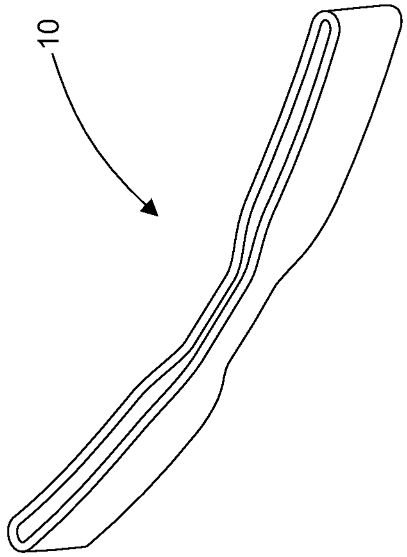
FIG. 6A is a perspective view of an embodiment of a repair device in the closed position.

While the blind repair device 10 is shown having a curve in FIGS. 1-2C and 5A-5G, in embodiments, the blind repair device can have no curve or be formed in any other suitable shape. For example, to make the repair device 10 more suitable for installation on s-shaped vanes, the device can also be formed in an s-shape to accommodate the vane. When formed of a resilient material 24, the repair device 10 need not exactly match the shape and dimensions of the vane 2 to be repaired, but being formed generally in the shape of the vane 2 enables the device 10 to be more easily fit to the vane 2. Having a curved shape can facilitate the expansion and closing of the repair device 10, for example, with reference to FIGS. 6A and 6B, one of the elongated portions 18 of a curved repair device 10 can be "snapped" open and deflected away from the opposing elongate portion 18 to receive a vane 2 through the central opening 14, and then closed once the repair device 10 has been properly positioned on the vane 2.

What is claimed is:

1. A repair device for repairing a vane of a blind system, the vane having a connection aperture, comprising:

a body having a generally oblong shape, the body having a first end portion and an opposed second end portion, a first elongate portion spanning from the first end portion to the second end portion, and a second elongate portion spanning from the first end portion to the second end portion, wherein the first elongate portion and the second elongate portion each have a respective longitudinal axis extending from the first end portion to the second end portion, and wherein each of the first elongate portion and the second elongate portion is symmetrical about its respective longitudinal axis;

wherein the first and second elongate portions define a central opening therebetween extending from the first end portion to the second end portion, the central opening configured to receive the vane therethrough; and wherein the first elongate portion and the second elongate portion each have a respective upper edge and a respective lower edge, each respective upper edge defining a respective first notch and each respective lower edge defining a respective second notch, wherein the respective first and second notches are approximately midway between the first end portion and the second end portion;

wherein the first and second elongate portions each have a respective inner surface and outer surface, and wherein each respective first notch and second notch extends all the way from the respective inner surface to the respective outer surface, thereby forming a respective narrowed section of each of the first and second elongate portions, the respective narrowed sections thereby forming a reinforcement structure configured to be aligned with the connection aperture of the vane.

2. The repair device of claim 1, wherein the body comprises one or more cutouts for facilitating opening or expansion of the repair device for receiving the vane.

3. The repair device of claim 1, wherein the body comprises one or more gripping elements located on the inner surface of at least one of the first and second elongate portions for gripping the vane.

4. The repair device of claim 3, wherein the one or more gripping elements comprise one or more teeth extending radially inwardly from the inner surface of at least one of the first and second elongate portions.

5. The repair device of claim 4, wherein the one or more teeth comprise one or more arrays of teeth arranged in an opposing and alternating manner.

6. The repair device of claim 3, wherein the one or more gripping elements comprise a plurality of nodes arranged along the inner surface of at least one of the first and second elongate portions.

7. The repair device of claim 1, wherein the repair device is made of at least a resilient material.

8. The repair device of claim 7, wherein the body comprises flexible portions comprising the resilient material, and rigid portions comprising a rigid material.

9. The repair device of claim 8, wherein the rigid portions comprise the resilient material reinforced with the rigid material.

10. The repair device of claim 8, wherein the rigid portions comprise rigid material fixed to the resilient material.

11. The repair device of claim 8, wherein the rigid portions comprise rigid material sandwiching the resilient material.

12. The repair device of claim 1, wherein the repair device is made of at least a rigid material.

13. The repair device of claim 1, wherein the body comprises at least one chamfered portion adjacent an inner surface of the body for facilitating the insertion of the vane into the central opening.

14. The repair device of claim 1, wherein the body is curved.

15. A repair device for repairing a vane of a blind system, the vane having a connection aperture, comprising:

a body having a generally oblong shape, the body having a first end portion and an opposed second end portion, a first elongate portion spanning from the first end portion to the second end portion, and a second elongate portion spanning from the first end portion to the second end portion, wherein the first elongate portion and the second elongate portion each have a respective longitudinal axis extending from the first end portion to the second end portion, and wherein each of the first elongate portion and the second elongate portion is symmetrical about its respective longitudinal axis;

wherein the first and second elongate portions define a central opening therebetween extending from the first end portion to the second end portion, the central opening configured to receive the vane therethrough;

wherein the body is actuable between an expanded position for receiving the vane therethrough, and a closed position for securing the repair device to the vane; and wherein the first elongate portion and the second elongate portion each have a respective upper edge and a respective lower edge, each respective upper edge defining a respective first notch and each respective lower edge defining a respective second notch, wherein the respective first and second notches are approximately midway between the first end portion and the second end portion;

wherein the first and second elongate portions each have a respective inner surface and outer surface, and wherein each respective first notch and second notch extends all the way from the respective inner surface to the respective outer surface, thereby forming a respective narrowed section of each of the first and second elongate portions, the respective narrowed sections thereby forming a reinforcement structure configured to be aligned with the connection aperture of the vane.

16. The repair device of claim 15, wherein the body is curved, and in the expanded position the first elongate portion of the body is deflected away from the second elongate portion of the body to expand the central opening.

17. The repair device of claim 15, wherein the body comprises one or more cutouts for facilitating actuation of the repair device between the expanded and closed positions.

18. The repair device of claim 15, wherein the repair device is made of at least a resilient material.

19. The repair device of claim 4, wherein each tooth of the one or more teeth is a ridge that extends from the upper edge to the lower edge of the at least one of the first and second elongate portions.

20. The repair device of claim 15, further comprising one or more teeth extending radially inwardly from the inner surface of at least one of the first and second elongate portions, wherein each tooth of the one or more teeth is a ridge that extends from the upper edge to the lower edge of the at least one of the first and second elongate portions.

* * * * *